Oct. 17, 1939.
A. D. EITZEN
Re. 21,235
STOCK TICKER AND TAPE PULLER
Original Filed Sept. 1, 1931
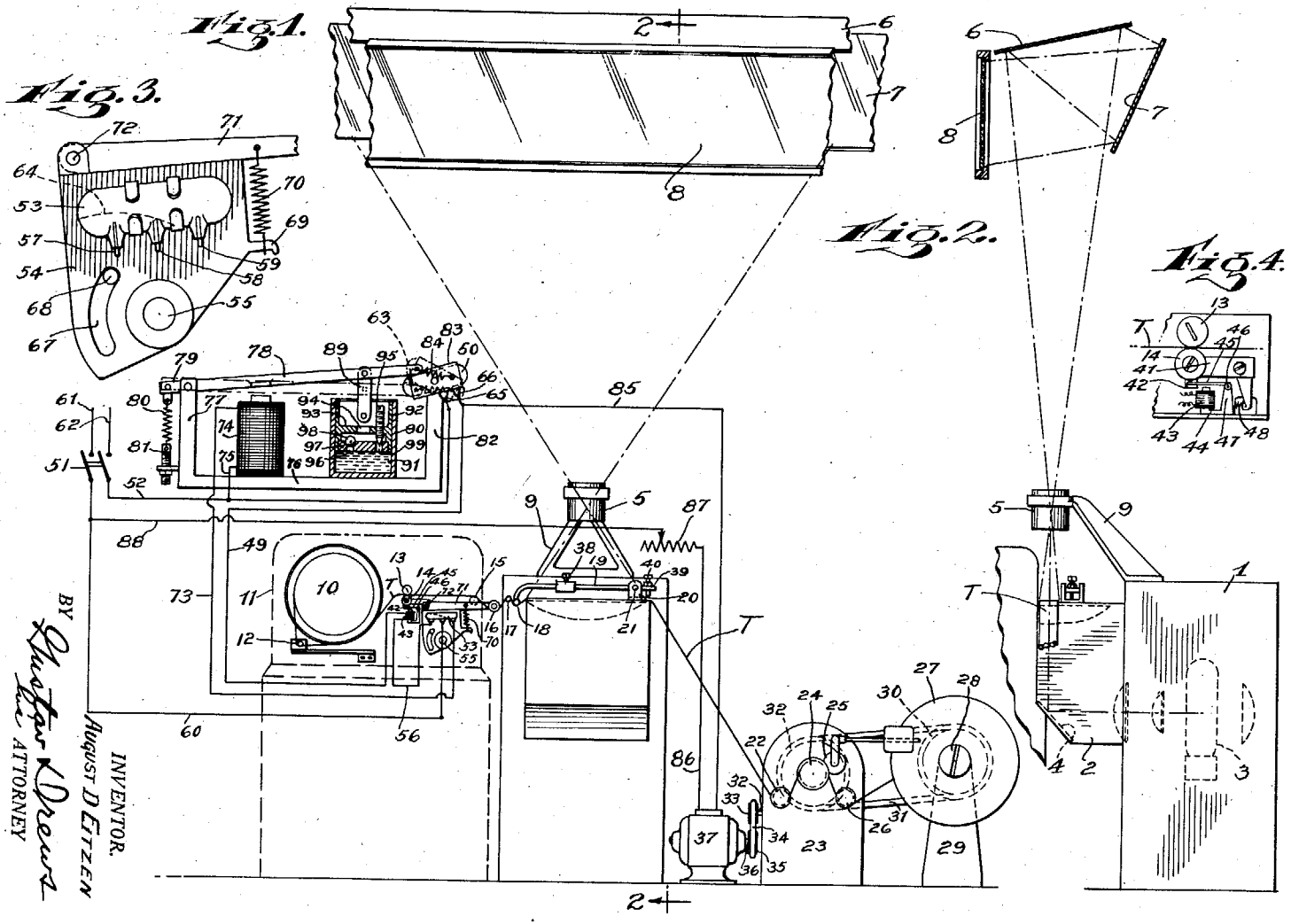
INVENTOR.
AUGUST D EITZEN
BY Gustav L Drews
his ATTORNEY Reissued Oct. 17, 1939

Re. 21,235

UNITED STATES PATENT OFFICE 21,235

STOCK TICKER AND TAPE PULLER

August D. Eitzen, Rockville Centre, N. Y., assignor to News Projection Corporation, New York, N. Y., a corporation of New York Original No. 2,051,691, dated August 18, 1936, Serial No. 560,643, September 1, 1931. Application for reissue April 1, 1938, Serial No. 199,494

33 Claims. (Cl. 178—42)

This invention relates to news projection machines in general, and more especially to stock quotation projecting machines.

Among the objects of the present invention, it is aimed to provide an improved combination involving a high speed stock quotation ticker of the type recently adopted and projecting machine for projecting images of the markings formed by the ticker onto a screen.

With the stock quotation projecting machines at present in use, when a ticker comes to rest after transmitting a message, a number of quotations are located on the portion of the tape disposed between the ticker and the projection aperture, images of which quotations consequently will not be projected until the ticker resumes its operation, and as a result of this condition, if the period of rest endures for any considerable length of time, the trader who is being guided by the screen will naturally be at a disadvantage as compared to the trader who is following the tape direct.

In view of the foregoing, the present invention aims specifically to provide an improved stock quotation projecting machine in which after a message is transmitted by the ticker, and the printing operation comes to rest, the feed of the tape will continue until the last quotation printed is projected before the feed also comes to rest.

These and other features, capabilities and advantages of this invention will appear from the subjoined detail description of one specific embodiment thereof illustrated in the accompanying drawing in which Figure 1 is a front elevation of a stock quotation projecting machine showing the wiring diagrammatically and part of the control mechanism enlarged in association with the wiring;

Fig. 2 is a fragmental section on the line 2—2 of Fig. 1;

Fig. 3 is an enlarged fragmental detail of another portion of the control mechanism; and Fig. 4 is an enlarged fragmental detail of still another portion of the control mechanism.

In the embodiment illustrated, there is shown a standard lamp housing 1, having a lateral extension 2 provided at the upper end thereof with a light aperture extending the full length of the extension across which the tape T passes, as a result of which the light rays from the lamp 3 being deflected by the deflector 4 pass upwardly through the tape T and then through the objective lens contained in the housing 5 to form images on the deflector 6, which are deflected onto the deflector 7 and then deflected onto the screen 8 in the usual way.

The housing 5 of the objective lens is secured at the upper end of a bracket 9 extending upwardly from the lamp housing 1. The tape T in the usual way extends from the supply reel 10 formed on the ticker 11 diagrammatically shown, down below the abutment 12 and then up under the feed roller 13 of the ticker in engagement with which the tape is normally pressed by the pressure roller 14. From the feed roller 13, the tape T passes over the guide 15 and then down under the finger 16, and up over the guide 17 and then under the finger 18 of the lever 19 pivotally connected at 21 to the bracket 20, and then over the light aperture formed at the top of the extension 2 down to and under the idler 22 formed on the housing 23, and then over the tape pulling roller 24 in engagement with which the tape is maintained by the pressure roller 25, then under the idler 26 and then to the rewind reel 27 pivotally mounted on the shaft 28 fulcrumed in the upper end of the bracket 29. The shaft 28 of the rewind reel 27 has mounted thereon the pulley 30 which is connected by the spring belt 31 with the pulley 32 connected to the reduction gearing mounted in the housing 23. The tape pulling roller 24 is also connected to the reduction gearing (not shown) mounted in the housing 23. The reduction gearing has a shaft 32, which has formed thereon a pulley 33 connected by the belt 34 to the pulley 35 mounted on the shaft 36 of the motor 37.

The finger 18 in the present instance serves as the vibration dissipating device, the pressure of which on the tape is adjustable by the weight 38 adjustably mounted on the arm 19. The extension 39 of the arm 19 is provided with an adjustable stop 40 to determine the distance of movement of the arm 19 and also to cooperate with the finger 18 to maintain the portion of the tape T located at the light aperture, smooth and even throughout when the tape T is at rest.

The control mechanism now to be described forms the main subject matter of the present invention.

The pressure roller 14 of the standard ticker is mounted on a bracket 41, which has a laterally extending finger 42, which has heretofore been used as an engagement point for the finger of the attendant to depress the pressure roller 14 in order to facilitate threading the tape T between the feed roller 13 and pressure roller 14. Use is made of this finger 42 so that the pressure roller 14 may cooperate in the control mechanism now being described.

A magnet 43 is mounted on a bracket 44, the core of which when energized will attract the armature 45 pivotally secured at 46 to the upward extension 47 of the bracket 44. The armature 45, as shown in Figs. 1 and 4, rests on the finger 42 so that when the armature 45 is attracted by the magnet 43, it will depress the pressure roller 14 against the tension of the spring 48 to liberate the tape T from frictional engagement with the feed roller 13. The magnet 43 is connected by the conductor 49 with one of the terminals of the fluid mercury switch 50, the other terminal of which is connected to the circuit breaker 51, by the conductor 52. The magnet 43 is also connected to the fluid mercury switch 53 mounted on the bracket 54 pivotally connected to the stub shaft 55, the conductor 56 extending from the magnet 43 to the terminal 57 of the mercury switch 53. The mercury switch 53 is provided with two additional terminals 58 and 59, the terminal 58 being connected to the circuit breaker 51 by the conductor 60. From the foregoing, it will appear that when the mercury switch 53 is disposed in the position indicated in Figs. 1 and 3 and the circuit breaker 51 is connected to the main source of supply indicated by the leads 61 and 62, and the switch 50 is disposed in the position indicated in Fig. 1, the magnet 43 will be de-energized since the mercury defined by the dotted line 63 clears the terminals of the switch 50 to break the circuit at that point, although the mercury defined by the dotted line 64 of the switch 53 is in position to establish a circuit from the terminal 57 to the terminal 58. In such position, the pressure roller 14 will be free to press the tape T against the feed roller 13, ready to feed the tape upon the initial message transmitting impulse of the ticker 11.

In order to rock the switch 50 to cause the mercury thereof to bridge the terminals 65 and 66, the mechanism now to be described is provided. The bracket 54 is provided with an arcuate slot 67 to receive the fixed pin 68, which determines the distance of throw or movement of the bracket 54 about the pivot pin 55. The bracket is also provided with an extension 69, which is connected by the spring 70 to the arm 71 pivotally connected at 72 to the bracket 54, which arm in turn is provided at its free end with the finger 16 resting on the tape T between the abutments 15 and 17. The terminal 59 of the switch 53 is connected by the conductor 73 with the magnet 74, which is connected by the conductor 75 to the conductor 52, extending to the circuit breaker 51. The magnet 74 is preferably mounted on the bracket 76, having an extension 77 on which is pivotally mounted the armature 78, the extension 79 of which is connected by the spring 80 to the abutment 81 to urge the armature 78 upwardly away from the magnet 74. The bracket 76 has also an extension 82, at the upper end of which is pivotally mounted the housing 83 in which the mercury switch 50 is secured. One end of the housing 83 is connected by the spring 84 with the free end of the armature 78. The housing 83, spring 84 and armature 78 thus form a load and fire mechanism for snapping the housing into either of two extreme positions, depending upon the position of the armature 78. From the foregoing, it will thus appear that when the ticker operates to discharge tape, the tape T will form a loop to permit the finger 16 to descend and carry with it the bracket 54, in turn to rock the cartridge 53, so that the mercury therein will clear terminal 57 and bridge the terminals 58 and 59 as a result of which the magnet 74 will be energized to attract the armature 78, depressing it into the dash and dot line position of Fig. 1 in turn to rock the cartridge 50 into the dotted line position of Fig. 1, to cause the mercury in the cartridge 50 to bridge the terminals 65 and 66. The current for the motor 37 will be established when the mercury in the cartridge 50 is thus caused to bridge the terminals 65 and 66, the terminal 66 being connected by the conductor 85 to one of the terminals of the motor 37, and the other terminal of the motor 37 being connected by the conductor 86 to the rheostat 87, which is connected by the conductor 88 to the conductor 60. The armature 78 as shown in Fig. 1, is connected by the link 89 with a dash pot, permitting the quick and immediate closing of the circuit after the ticker starts operating from a period of rest. This dash pot, however, controls the armature 78 to retard its ascent after the ticker has come to rest from a message transmitting period to maintain the cartridge 50 in circuit making position long enough to permit the tape pulling roller 24 to draw the tape T a sufficient distance across the light aperture, so that the last quotation printed will have reached the light aperture to be projected. The movement retarding effect of this dash pot on the armature 78 may be adjusted according to the number of quotations to be advanced from the ticker to the light aperture.

When the ticker stops printing, the roller 24 absorbs the loop and causes the finger 16 to ascend, contact is broken between the terminals 58 and 59 and contact is established between the terminals 57 and 58 energizing the magnet 43 to withdraw the pressure roller 14 from the tape. The tape roller 24 will then continue drawing the tape T across the light aperture as aforesaid until the last quotation printed will have reached the light aperture to be projected or as otherwise predetermined.

Any suitable dash pot, preferably adjustable, may be used and so control the armature 78. In the present instance, there is provided a cup 90, containing an oil bath 91 and a sleeve 92 to which the link 89 is pivotally connected. The sleeve 92 is provided with a disc 93, having an opening 94 and an adjustable pin 95 screw threadedly connected to the disc 93. Below the disc 93, the sleeve 92 is provided with a second disc 97, having a valve opening 96 provided with a ball valve 98 and a second valve opening 99 into which the tapered lower end of the pin 95 extends, the clearance between the pin 95 and opening 99 depending upon the retarding effect to be produced. From the foregoing, it will be clear that when the magnet 74 is energized to attract the armature 78, the valve ball 98 will clear the opening 96 to permit the oil 91 freely to pass therethrough and up through the opening 94 and, of course, some oil will also pass up through the opening 99 and the clearance formed by the pin 95, and, on the other hand when the sleeve 92 is in its lowermost position, and the magnet 74 is then de-energized, to permit the spring 80 to raise the armature 78, that the oil above the disc 96 can only pass below the disc 97 through the clearance formed between the pin 95 and orifice 99.

From the foregoing, it will thus appear that in the slow upward movement of the sleeve 92, the cartridge 50 will be maintained in circuit making position where the current to the motor 37 and to the magnet 43 will be maintained until the free end of the armature 78 has passed above the pivot point of the housing 83 and the spring 84 also extends above the pivot point of the housing 83 to permit the tension of the spring 84 to snap the housing 83 into the position in full lines illustrated in Fig. 1, where it will cause the mercury contained in the cartridge 50 to clear the terminals 65 and 66.

As a safety feature to protect the tape from any undue drawing effect, resulting from the momentum of the motor after the current has so been interrupted by the movement of the cartridge 50, in which position the pressure roller 14 will be free again to press the tape against the feed roller 13, the spring 70 is provided to permit the arm 71 to be raised an additional distance. The tension of the spring 70 and this movement of the arm 71 will, of course, be determined according to the momentum of the motor and tape pulling mechanism to be used.

It is obvious that various changes and modifications may be made to the details of construction without departing from the general spirit of the invention as set forth in the appended claims.

I claim:

1. The combination of a ticker having a feed roller and a pressure roller for normally maintaining the tape in engagement with the feed roller, a tape pulling device, an electric motor for driving said tape pulling device, and a control mechanism for controlling the operation of the motor and the position of said pressure roller, said control mechanism consisting of a finger resting on the tape between the ticker and the tape pulling device, a magnet operatively connected to said pressure roller, and an electric switch operatively connected to said finger, said switch being included in the electric circuit of said magnet and motor and the finger being responsive to the tension in the tape to actuate said switch.

2. The combination of a ticker having a tape feed, an electrically controlled device for disabling said tape feed, a tape pulling device for drawing the tape away from said ticker, a motor for actuating said tape pulling device, means including an electric switch for interrupting the circuit to said motor and to said electrically controlled device when said ticker comes to rest, and retarding means for retarding the actuation of said circuit interrupting means a predetermined period, whereby after said ticker has come to rest, said tape pulling device will withdraw the tape a predetermined distance before coming to rest.

3. The combination of a ticker having a tape feed, a device for disabling said tape feed, a tape pulling device for drawing the tape away from said ticker, means for interrupting the operation of the tape pulling device and for actuating said tape feed disabling device when the ticker comes to rest, and means for delaying the action of said interrupting means a period sufficient to enable the last printed quotation to be advanced from said ticker after the ticker has come to rest, said delaying means including a dash pot.

4. The combination of a ticker having a tape feed, a device for disabling said tape feed, a tape pulling device for drawing the tape away from said ticker, means for interrupting the operation of the tape pulling device and for actuating said tape feed disabling device when the ticker comes to rest, and means for delaying the action of said interrupting means a period sufficient to enable the last printed quotation to be advanced from said ticker after the ticker has come to rest, said interrupting means including an electric switch, said delaying means being operatively connected to said switch and having a dash pot to cause said switch to establish the current quickly and to delay the actuation of said switch preparatory to interrupting the current.

5. The combination of a ticker having a tape feed, a device for disabling said tape feed to release the tape, a tape pulling device for drawing the tape away from said ticker when the tape is released by said disabling device, means for interrupting the operation of the tape pulling device and the disabling device when the ticker comes to rest, and means for delaying the action of said interrupting means a period sufficient to enable the last printed quotation to be advanced a predetermined distance from said ticker after the ticker has come to rest.

6. The combination of a ticker having a resiliently mounted tape feed pressure roller; a tape pulling device for drawing the tape away from said ticker; a motor for actuating said tape pulling device; and means for controlling the operation of said motor and the position of said tape feed pressure roller comprising a main actuator having a finger responsive to deflections in the tape between the ticker and tape pulling device, a main magnet for moving said pressure roller out of tape engaging position, a secondary switch, a secondary actuator for actuating said secondary switch, a secondary magnet for actuating said secondary actuator, and a main switch for controlling the current to said secondary magnet and for cooperating with said secondary switch to control the current to said motor and said main magnet, said main actuator being operatively connected to operate said main switch initially to cause the energization of said secondary magnet when said ticker operates in turn to cause the actuation of said secondary actuator to actuate said secondary switch to establish the electric circuit to said motor and to said main magnet and upon arrest of the ticker initially to cause said secondary magnet to be deenergized, and means for thereupon slowly actuating said secondary actuator to actuate said secondary switch to interrupt the current to said motor and main magnet.

7. The combination of a ticker having a resiliently mounted tape feed pressure roller; a tape pulling device for drawing the tape away from said ticker; a motor for actuating said tape pulling device; and means for controlling the operation of said motor and the position of said tape feed pressure roller comprising a main actuator having a finger responsive to deflections in the tape between the ticker and tape pulling device, a main magnet for moving said pressure roller out of tape engaging position, a secondary switch, a secondary actuator for actuating said secondary switch, a secondary magnet for actuating said secondary actuator, a main switch for controlling the current to said secondary magnet and for cooperating with said secondary switch to control the current to said motor and said main magnet, said main actuator being operatively connected to operate said main switch initially to cause the energization of said secondary magnet when said ticker operates in turn to cause the actuation of said secondary actuator to actuate said secondary switch to establish the electric circuit to said motor and to said main magnet and upon arrest of the ticker initially to cause said secondary magnet to be deenergized, means for thereupon slowly actuating said secondary actuator to actuate said secondary switch to interrupt the current to said motor and main magnet, and resilient means for permitting said main actuator to be further actuated after said secondary switch has been actuated to interrupt the current to said motor and main magnet to take care of the continued advance of the tape resulting from the momentum of the motor.

8. The combination with a ticker having a tape feeding mechanism, of a device for disabling said tape feeding mechanism to release the tape, a tape pulling device for drawing the tape from said ticker, a motor for actuating said pulling device, means including a switch for establishing a circuit to actuate said disabling device and also establish the circuit to said motor when said ticker operates and in turn operative to interrupt the circuit to said disabling device and to interrupt the circuit to said motor when said ticker comes to rest, and a retarding means for retarding the actuation of said circuit interrupting means, after said ticker comes to rest, a period sufficient to enable said pulling device to advance the tape a predetermined distance from said ticker before coming to rest.

9. The combination with a ticker having a tape feeding mechanism, of a device for disabling said tape feeding mechanism to release the tape, a tape pulling device for drawing the tape from said ticker, a motor for actuating said tape pulling device, means including an electromagnet and a switch normally in circuit interrupting position for establishing a circuit to actuate said disabling device and for establishing the circuit of said motor, initiating means responsive to deflections in the tape including a second switch for energizing said electromagnet when said ticker operates to actuate said first named switch into circuit making position and in turn to deenergize said electromagnet when said ticker comes to rest to permit said first switch to return to circuit interrupting position, and retarding means for retarding the actuation of the said electromagnet, after said ticker comes to rest, a period sufficient to enable said pulling device to advance the tape a predetermined distance from said ticker before coming to rest.

10. The combination with a ticker having a tape feeding mechanism, of a device for disabling said tape feeding mechanism to release the tape, a tape pulling device for drawing the tape from said ticker, means for actuating said disabling device and said pulling device, a device responsive to deflections in the tape for controlling the actuation of said disabling device and said tape pulling device, and means for retarding for a predetermined period of time the release of said disabling device and the arrest of said tape pulling device before returning to normal inoperative position to enable said tape pulling device to advance the tape a predetermined distance from said ticker before coming to rest.

11. The combination with a ticker having a tape feed, of a device for disabling said tape feed to release the tape, a tape pulling device for drawing the tape from said ticker, a motor for actuating said tape pulling device, means including an electric switch for interrupting the circuit to said motor and for releasing said disabling device to restore said tape feed, and means for retarding the actuation of said circuit interrupting means, after the ticker has come to rest, a predetermined period whereby said tape pulling device is enabled to withdraw the tape to a predetermined distance from said ticker.

12. The combination with a ticker having a tape feed, of a device for disabling said tape feed to release the tape, a tape pulling device for drawing the tape from said ticker, a motor for actuating said tape pulling device, and means including an electric switch for interrupting the circuit to said motor and for releasing said disabling device to restore said tape feed.

13. The combination with a ticker having a tape feed normally operative, of a device including an electromagnet for disabling said tape feed to release the tape, a tape pulling device for drawing the tape from said ticker, means for actuating said tape pulling device, and means for delaying for a period of time after the ticker has come to rest, the deenergization of said electromagnet and the arrest of said actuating means before returning to normal inoperative position to enable said tape pulling device to advance the tape a predetermined distance from said ticker before coming to rest.

14. The combination with a ticker having a tape feed normally operative, of a device including an electromagnet for disabling said tape feed to release the tape, a tape pulling device for drawing the tape from said ticker, a motor for actuating said pulling device, means including a switch for establishing a circuit to energize said electromagnet and to establish the circuit for said motor, and means for delaying for a predetermined period of time the actuation of said switch to interrupt the current to said electromagnet and to said motor before returning to normal inoperative position to enable said tape pulling device to advance the tape a predetermined distance from said ticker before coming to rest.

15. The combination with a ticker having a tape feed, of a device for disabling said tape feed to release the tape, a tape pulling device for drawing the tape from said ticker when the tape is released by said disabling device, a motor for actuating said tape pulling device, means including an electromagnet for controlling said disabling device, means including an electric switch for establishing the current to energize said electromagnet and for establishing the current to actuate said motor, means including a second electromagnet for controlling said switch, and means including a second switch to establish a current to energize said second electromagnet.

16. The combination with a ticker having a tape feed, of a device for disabling said tape feed to release the tape, a tape pulling device for drawing the tape from said ticker when the tape is released by said disabling device, a motor for actuating said tape pulling device, means including an electromagnet for controlling said disabling device, means including an electric switch for establishing the current to energize said electromagnet and for establishing the current to actuate said motor, means including a second electromagnet for controlling said switch, a second switch, means responsive to deflections in the tape to actuate said second switch, and means including said second switch to establish a current to energize said second electromagnet.

17. The combination with a ticker having a tape feed, of a device for disabling said tape feed to release the tape, a tape pulling device for drawing the tape from said ticker when the tape is released by said disabling device, a motor for actuating said tape pulling device, means including an electromagnet for controlling said disabling device, means including an electric switch for establishing the current to energize said electromagnet and for establishing the current to actuate said motor, means including a second electromagnet for controlling said switch, means including a second switch to establish a current to energize said second electromagnet, and means including a dash pot for delaying the restoration of said second electromagnet for a period of time to enable the last printed quotation to be advanced a predetermined distance from said ticker after the ticker has come to rest.

18. The combination of a ticker having a tape feed, an electrically controlled actuating means for disabling said tape feed, a tape pulling device for drawing the tape through said ticker, a motor independent of said ticker for actuating said tape pulling device, means including an electric switch for interrupting the circuit to said motor and to said electrically controlled actuating means when said ticker comes to rest, and retarding means for retarding the actuation of said circuit interrupting means a predetermined period.

19. The combination of a ticker having a tape feed, an electrically controlled actuating means for disabling said tape feed, a tape pulling device for drawing the tape through said ticker, a motor independent of said ticker for actuating said tape pulling device, and means including an electric switch for interrupting the circuit to said motor and to said electrically controlled actuating means when said ticker comes to rest.

20. The combination with a ticker having a tape feed, of a device operatively associated with the tape feed of said ticker for disabling said tape feed to release the tape after said ticker comes to rest, and a tape pulling device for drawing the tape from said ticker when said tape feed is so disabled.

21. The combination with a ticker having a tape feed, of a device operatively associated with the tape feed of said ticker for disabling said tape feed to release the tape after said ticker comes to rest, and a tape puller operatively associated with said device for drawing the tape from said ticker when said tape feed is so disabled.

22. In combination, means for printing upon a record strip spaced from a field of vision to include a length of strip between said printing means and the field of vision corresponding to the space normally occupied by a number of quotations on the strip, a finger responsive to deflections in the strip between said printing means and the field of vision, strip advancing means, and electrical means including a retarded stop device controlled by said finger for causing said strip advancing means to advance said strip through said printing means to and across the field of vision following a printing operation a distance sufficient to bring the last character of the quotation last printed into the field of vision during a time of greater than a given duration wherein no subsequent printing operation occurs.

23. In combination, means for printing upon a record strip spaced from a field of vision to include a length of strip between said printing means and the field of vision corresponding to the space normally occupied by a number of quotations on the strip, a finger responsive to deflections in the strip between said printing means and the field of vision, strip advancing means, and a control operatively associated with said finger for causing said strip advancing means to advance said strip through said printing means to and across the field of vision following a printing operation a distance sufficient to bring the character last printed into the field of vision during a time greater than a given duration wherein no subsequent printing operation occurs.

24. In a tape actuating apparatus, a retarded stop device comprising a tape advancing element, means for driving said element, an electromagnet energized to control the driving of said element, and a mechanical stop means effective following the deenergization of said electromagnet for establishing the continued driving of said element to a limited extent.

25. In a tape actuating apparatus, a retarded stop device comprising a tape advancing element, a motor for driving said element, an electric circuit including a switch for said motor, an electromagnet energized to close said switch to effect the driving of said element, and a slow acting dash pot operatively connected to said switch effective following the deenergization of said electromagnet for establishing the continued driving of said element to a limited extent.

26. In combination, a printer for intermittently printing upon a narrow tape lines of printed matter reading longitudinally of the tape, a field of vision, a tape advancer for advancing the tape across said field of vision as it is printed by said printer, and a control operatively associated with said printer for enabling said tape advance to be started after said printer has been started, said control including a retarded stop device operatively associated with said tape advancer for effecting the continuous movement of said tape through said printer to and across said field of vision after said printer has come to rest during a time at least equal to the time required to advance the quotation last printed by said printer into the field of vision.

27. In combination, a ticker for intermittently printing upon a narrow ticker tape a succession of quotations reading longitudinally of the tape, a field of vision spaced from said ticker to include between said ticker and said field of vision a length of tape corresponding to the space normally occupied by a plurality of characters forming a number of quotations on the tape, a tape advancer for advancing the tape across said field of vision, and a control for said tape advancer operatively associated with said ticker for enabling said tape advancer to be started after said ticker has been started, said control including a retarded stop device operatively associated with said tape advancer for continuing the operation of said tape advancer to advance the tape continuously through said ticker to and across said field of vision after said ticker has come to rest during a time at least equal to the time required to advance into the field of vision the last character of the quotation last printed by said ticker.

28. In combination, a printer for intermittently printing upon a narrow tape a succession of quotations reading longitudinally of the tape, a field of vision, a tape advancer for advancing the tape across said field of vision as it is printed by said printer, means operatively associated with said printer for initially discharging a length of tape corresponding to the space occupied by a plurality of characters forming a number of quotations in turn to form a loop between said printer and said field of vision, a control for said tape advancer including a finger responsive to deflections in the tape resting on the tape between said printer and said field of vision, and a retarded stop device operatively associated with said means and said control for effecting the continuous operation of said tape advance to advance the tape through said printer to and across said field of vision after said printer has come to rest during a time at least equal to the time required to advance the last character of the quotation last printed by said printer into the field of vision.

29. In combination a printer for intermittently printing upon a narrow tape lines of printed matter reading longitudinally of the tape, a field of vision, a tape-advancing system for advancing the tape from the printer into said field of vision, a control for the said tape-advancing system, said control including a retarded stop device operatively associated with the said tape-advancing system, for assuring continuity of movement of said tape through said printer into said field of vision after said printer has come to rest for a time longer than the time required to advance the character last printed by said printer into the field of vision and for thereupon disabling the tape-advancing system until the printer resumes printing.

30. In combination, a printer for intermittently printing upon a narrow tape lines of printed matter reading longitudinally of the tape, a field of vision, a tape-advancing system for advancing the tape across the field of vision, including means for feeding the tape forward after each character is printed on the tape to a position to receive the imprint of the next character of a continuous message, a retarded stop device operatively associated with the tape advancing system for permitting movement of the tape to be effected through the printer and into the field of vision after said printer has come to rest and for a distance at least equal to the length of tape between the printing point of the printer and a point within the field of vision, and means co-acting with the retarded stop device to thereafter effect discontinuance of further progress of the tape across the field of vision until the printer resumes the printing of a further message.

31. In combination, a recorder including a tape reel, a support spaced from said recorder, a tape advancer disposed on the opposite side of said support from said recorder and arranged to draw the tape directly from said reel and across said support in a continuous movement, and a control for enabling said tape advancer to be started after said recorder has been started, said control including a timing means comprising a dash pot, means for operating the movable element of said dash pot into operated position, the period of movement of said movable element from operated back to normal position, being not less than the time required for the tape advancer to advance the tape from recording position onto said support, said element in its normal position acting to render the tape advancer ineffective to advance the tape.

32. In combination, a support, a data recording device located at one side of said support and having a tape supply, a tape pulling device located at the opposite side of said support for feeding the tape from said supply, means for operating said tape pulling means continuously during a continuous succession of cycles of operation of said recording device whereby said tape is drawn in a continuous movement across said support during said continuous succession of cycles of operation of the data recording device, means for stopping the movement of the tape upon interruption of the operation of the data recording device, and means for delaying the stopping of the tape until the last printed character has been advanced onto said support.

33. In combination, a recorder including means for printing stock quotations on a tape, a field of vision spaced from said recorder, a tape-pulling mechanism for advancing the tape across said field of vision, means for stopping the movement of said tape across said field of vision upon interruption of the operation of said printer, and means selectively responsive to signalling conditions for delaying the stopping of the tape until the last quotation recorded prior to said interruption has been advanced into said field of vision.

AUGUST D. EITZEN.